(12) United States Patent
Mizutani et al.

(10) Patent No.: US 10,523,273 B1
(45) Date of Patent: Dec. 31, 2019

(54) VEHICLE-MOUNTED COMMUNICATION SYSTEM

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Tomohiro Mizutani, Yokkaichi (JP); Tsuyoshi Kontani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/325,278

(22) PCT Filed: Sep. 15, 2017

(86) PCT No.: PCT/JP2017/033509
§ 371 (c)(1),
(2) Date: Feb. 13, 2019

(87) PCT Pub. No.: WO2018/088030
PCT Pub. Date: May 17, 2018

(30) Foreign Application Priority Data

Nov. 10, 2016 (JP) .................................. 2016-219928

(51) Int. Cl.
*H04B 3/54* (2006.01)
*H04L 29/08* (2006.01)
(Continued)

(52) U.S. Cl.
CPC ......... *H04B 3/542* (2013.01); *B60R 16/0231* (2013.01); *H04B 3/548* (2013.01);
(Continued)

(58) Field of Classification Search
CPC ..................................................... H04B 3/542
See application file for complete search history.

(56) References Cited

U.S. PATENT DOCUMENTS

| 2003/0018422 A1 | 1/2003 | Akiyama |
| 2004/0083043 A1 | 4/2004 | Akiyama et al. |

(Continued)

FOREIGN PATENT DOCUMENTS

| JP | 2005-104453 A | 4/2005 |
| JP | 2007-027854 A | 2/2007 |

(Continued)

OTHER PUBLICATIONS

Mar. 29, 2019 English Translation of International Preliminary Report on Patentability Chapter II in International Patent Application PCT/JP2017/033509. (Year: 2019).*

(Continued)

*Primary Examiner* — Daniel J Cavallari
(74) *Attorney, Agent, or Firm* — Oliff PLC (57) ABSTRACT

A vehicle-mounted communication system that includes a plurality of electronic control units to which power is supplied from a positive and negative power supply trunk line installed in a vehicle, wherein: each of the electronic control units includes a first communication unit that performs power line communication via the power supply trunk line; and the electronic control units exchange communication signals with each other using the first communication units.

5 Claims, 7 Drawing Sheets

(51) Int. Cl.
*B60R 16/023* (2006.01)
*H04L 12/40* (2006.01)

(52) U.S. Cl.
CPC .............. *H04L 12/40* (2013.01); *H04L 67/12* (2013.01); *H04L 2012/40273* (2013.01)

(56) References Cited

U.S. PATENT DOCUMENTS

| | | | |
|---|---|---|---|
| 2005/0040709 A1 | 2/2005 | Enders et al. | |
| 2007/0251717 A1 | 11/2007 | Chiang | |
| 2017/0118038 A1* | 4/2017 | Ujiie | H04B 1/3822 |
| 2017/0201294 A1 | 7/2017 | Kanazawa et al. | |
| 2018/0251084 A1* | 9/2018 | Tateishi | B60R 16/03 |
| 2019/0007100 A1* | 1/2019 | Yamashita | H04L 25/02 |

FOREIGN PATENT DOCUMENTS

| | | |
|---|---|---|
| JP | 2007-300331 A | 11/2007 |
| JP | 2007-300633 A | 11/2007 |
| JP | 2010-288198 A | 12/2010 |
| JP | 2011-016476 A | 1/2011 |
| JP | 2013-187968 A | 9/2013 |
| JP | 2014-193654 A | 10/2014 |
| JP | 2015-067187 A | 4/2015 |
| JP | 2016-092825 A | 5/2016 |

OTHER PUBLICATIONS

Wikipedia contributors. "Electronic control unit." Wikipedia, The Free Encyclopedia. Wikipedia, The Free Encyclopedia, Jul. 21, 2019 . Web. Oct. 22, 2019. (Year: 2019).*
Oct. 10, 2017 International Search Report issued in International Patent Application No. PCT/JP2017/033509.

* cited by examiner

VEHICLE-MOUNTED COMMUNICATION SYSTEM

This application is the U.S. National Phase of PCT/JP2017/033509 filed Sep. 15, 2017, which claims priority from JP 2016-219928 filed Nov. 10, 2016, the entire disclosure of which is incorporated herein by reference.

BACKGROUND

The present disclosure relates to a vehicle-mounted communication system.

Control systems that use multiple control devices, with each control device carrying out control based on computer programs (called simply "programs" hereinafter), are used in a variety of fields. In the field of automobile control, vehicles are provided with many ECUs (Electronic Control Units) serving as control devices, with the ECUs configured to exchange information over a vehicle-mounted LAN (Local Area Network) and carry out a variety of processes in cooperation and in tandem with each other.

For example, JP 2014-193654A describes a vehicle-mounted gateway that stores a routing map necessary for determining a relay destination for information, and that relays the information among a plurality of in-vehicle networks. In JP 2014-193654A, the in-vehicle networks communicate according to the CAN (Controller Area Network) communication standard, but the networks connected to the gateway also include networks that communicate according to another communication standard, such as Ethernet (registered trademark).

PLC (power line communication), in which communication signals are superposed over positive and negative power supply lines for supplying power, is sometimes used between control devices inside the vehicle and control devices outside the vehicle. For example, JP 2013-187968A discloses a charging communication ECU that uses power line communication to exchange data necessary for charging with a charging device located outside of the vehicle. The charging communication ECU is also connected to a vehicle-mounted communication network (in-vehicle network), but the power line communication terminates at the charging communication ECU and is thus clearly separated from communication among the ECUs.

With communication using an in-vehicle network, the vehicle body is normally used as a return path, and harnesses including the power supply lines are run vertically and horizontally throughout the vehicle. Compared to the weight of the vehicle body, the weight of these harnesses is not light enough to be ignored. Moreover, there tends to be an increase in power supply noise, voltage drops, and power loss as more power is consumed by vehicle-mounted devices. In response to this, Anette Sedlmaier, Michael Wortberg, Stefan Lobmeyer, and Karl Ring. "ATZ elektronik worldwide," Ausgabe, Issue 5, 2014, p. 52-56 proposes a centralized power supply architecture that uses a multi-drop connection for the power supply lines, from the engine compartment in the forward part of the vehicle body, to the rear part of the vehicle body.

SUMMARY

A vehicle-mounted communication system according to one aspect of the present disclosure includes includes a plurality of electronic control units to which power is supplied from a positive and negative power supply trunk line installed in a vehicle, wherein: each of the electronic control units includes a first communication unit that performs power line communication via the power supply trunk line; the electronic control units exchange communication signals with each other using the first communication units; a first electronic control unit among the plurality of electronic control units is communicatively connected, via a communication line that is different from the power supply trunk line, to an external electronic control unit not directly supplied with power from the power supply trunk line, the first electronic control unit further including: a second communication unit that receives a communication signal from the external electronic control unit; and a control unit that aggregates the communication signals received by the first communication unit and the second communication unit, and carries out information processing based on the aggregated communication signals, and a communication signal including information based on a processing result is sent to at least one of another electronic control unit of the plurality of electronic control units, the another electronic control unit being different from the first electronic control unit among the plurality of electronic control units, and the external electronic control unit.

Note that the present application can be realized not only as a vehicle-mounted communication system including such characteristics processing units, but also as a vehicle communication method that takes the characteristic processes as steps, a program for causing a computer to execute such steps, and so on. The vehicle-mounted communication system can also be partially realized as a semiconductor integrated circuit, or as a different system including a vehicle-mounted communication system.

DETAILED DESCRIPTION OF EMBODIMENTS

However, the content of Anette Sedlmaier, Michael Wortberg, Stefan Lobmeyer, and Karl Ring. "ATZ elektronik worldwide," Ausgabe, Issue 5, 2014, p. 52-56 is merely a proposal for solving problems pertaining to the supply of power, and has no effect in terms of changing communication media, communication network topologies, and so on.

An exemplary aspect of the disclosure provides a vehicle-mounted communication system that enables communication suited to a centralized power supply architecture.

According to the disclosure in the present application, communication suited to a centralized power supply architecture can be carried out.

First, embodiments of the present disclosure will be described as examples. The embodiments described hereinafter may be at least partially combined as desired.

(1) A vehicle-mounted communication system according to one aspect of the present disclosure includes a plurality of communication devices to which power is supplied from a positive and negative power supply trunk line installed in a vehicle, the system exchanging communication signals among the communication devices, wherein each of the communication devices includes a communication unit that performs power line communication via the power supply trunk line, and the communication devices exchange the communication signals with each other using the communication units.

According to this aspect, the plurality of communication devices are supplied with power from the positive and negative power supply trunk line, and exchange communication signals with each other through power line communication using the power supply trunk line as a communication medium. As a result, the number of power supply and communication harnesses can be reduced as compared to a conventional vehicle-mounted communication system in which power supply and communication are not carried out using the power supply trunk line. Additionally, a plurality of communication signals are exchanged simultaneously through the power line communication, and thus it is not necessary to provide a relay device that relays the communication signals among the communication devices.

(2) Preferably, the power supply trunk line is configured including a pair of conductive members opposing each other in a direction intersecting with a lengthwise direction, with an insulative material being located between the conductive members.

According to this aspect, power is supplied to the communication devices from the power supply trunk line, which is configured so that the pair of conductive members oppose each other in a direction intersecting with the lengthwise direction, with the insulative material located therebetween. Here, if the conductive members have a suitably low resistance value in the lengthwise direction, a comparatively low-resistance, collected power supply path is provided between the front part and the rear part of the vehicle, which makes it possible to supply power to the communication devices in a stable manner. Additionally, if the opposing surface area between the conductive members per unit of line length is kept constant, and the distance of the gap in the opposing direction is kept constant, a favorable communication path in which fluctuations in characteristic impedance are relatively low is provided. This makes it possible to carry out power line communication among the communication devices in a stable manner.

(3) Preferably, one of the communication devices is supplied with power from a positive and negative branch line branching from the power supply trunk line; and the communication unit of the one communication device carries out power line communication via the branch line and the power supply trunk line.

According to this aspect, a given single communication device is supplied with power from the branch line branching from the power supply trunk line, and exchanges communication signals through power line communication using the branch line and the power supply trunk line as a communication medium. Here, if the length of the branch line in the line direction is sufficiently short compared to the wavelength of the power line communication carrier waves, negative influence on the power supply to the communication devices and the power line communication will be favorably suppressed, which makes it possible to increase the freedom with which power supply lines can be laid with respect to the communication devices.

(4) Preferably, the one communication device is communicatively connected to an external communication device via a communication line different from the power supply trunk line, and further includes: a second communication unit that receives a communication signal from the external communication device; and a control unit that aggregates the communication signals received by the communication unit and the second communication unit, and carries out information processing based on the aggregated communication signals, and wherein a communication signal including information based on a processing result is sent to at least one of another communication device and the external communication device.

According to this aspect, a given single communication device is communicatively connected to one or more external communication devices via one or more communication lines that are different from the power supply trunk line. The given single communication device aggregates and carries out information processing on the communication signals from one or both of the other communication devices and the external communication device, and sends a communication signal including information based on the processing result to at least one of the other communication devices and the external communication device. Accordingly, the traffic of communication signals exchanged via the power supply trunk line is suppressed, which makes it possible to employ the network using the power supply trunk line as the highest-level network and locate more of the communication devices and the external communication device on the in-vehicle network.

(5) Preferably, the second communication unit carries out communication based on the Ethernet standard.

According to this aspect, the second communication unit carries out Ethernet communication, and thus the above-described single communication device can exchange communication signals at high speeds.

(6) Preferably, the vehicle-mounted communication system further includes a relay device that is communicatively connected to each of the communication devices and relays the communication signals exchanged among the communication devices, wherein the communication devices have redundant configurations in which the communication signals are exchanged via at least one of the power supply trunk line and the relay device.

According to this aspect, each of the plurality of communication devices is connected to the relay device via communication lines that are different from the power supply trunk line, for example, and each communication device is doubled so as to exchange the communication signals via at least one of the power supply trunk line and the relay device. As a result, the communication devices can exchange communication signals with each other with a high level of reliability.

Details of Embodiment of Present Disclosure

A specific example of a vehicle-mounted communication system according to an embodiment of the present disclosure will be described hereinafter with reference to the drawings. The technical features disclosed in the embodiments can be combined with each other as well.

First Embodiment

Figure 1:
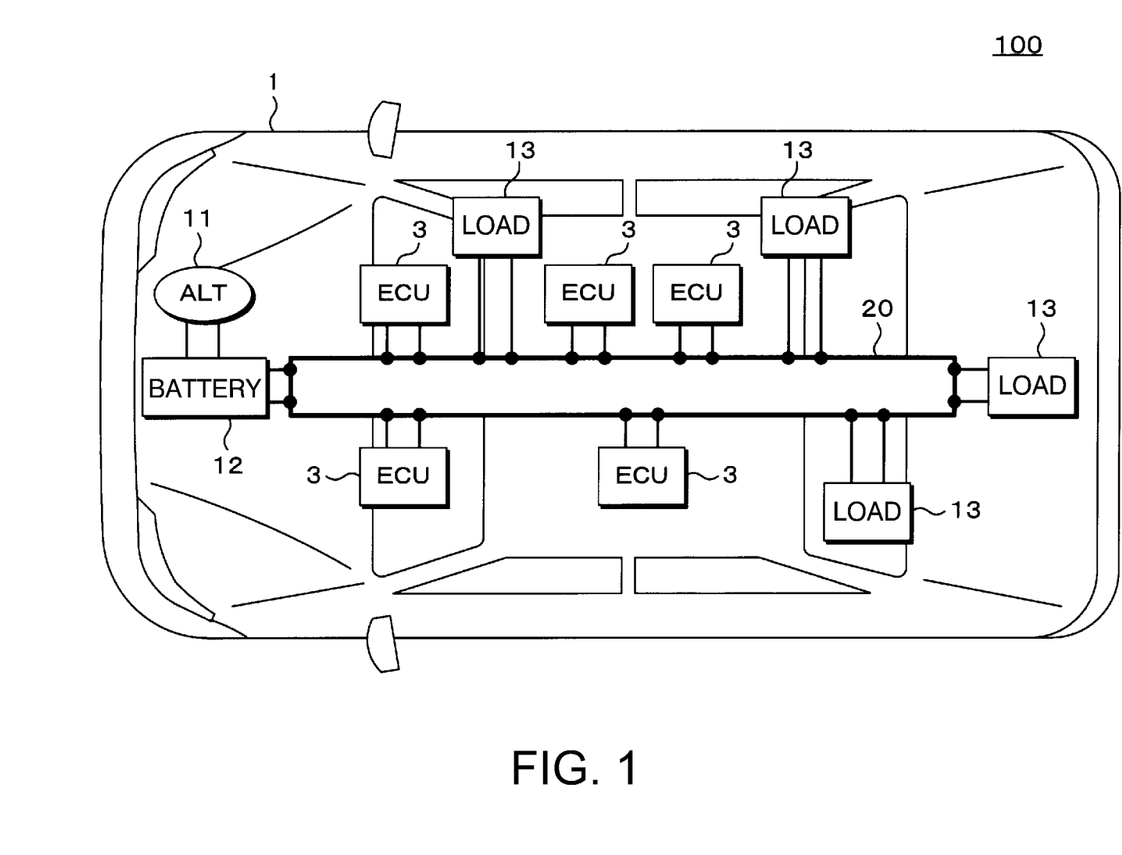
FIG. 1 is a diagram schematically illustrating an example of the configuration of a vehicle-mounted communication system according to a first embodiment of the present disclosure.
Figure 2:
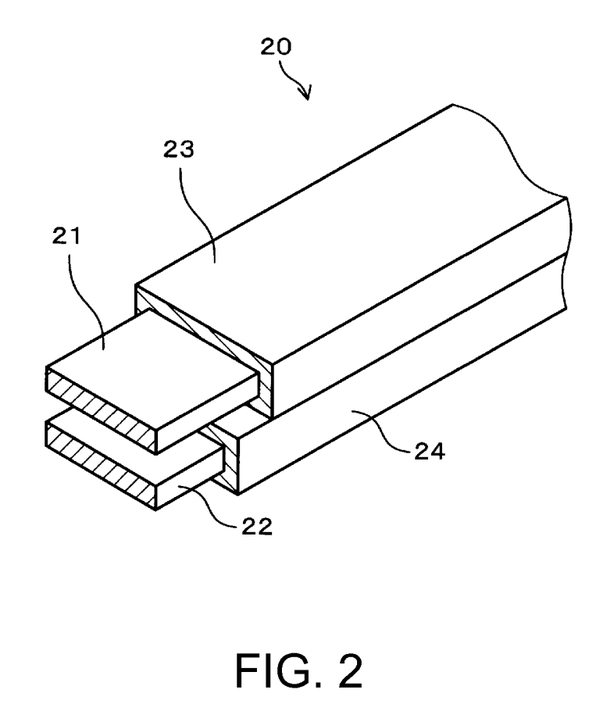
FIG. 2 is a vertical cross-sectional perspective view illustrating the configuration of a power supply trunk line.

FIG. 1 is a diagram schematically illustrating an example of the configuration of a vehicle-mounted communication system according to a first embodiment of the present disclosure, and FIG. 2 is a vertical cross-sectional perspective view illustrating an example of the configuration of a power supply trunk line. The vehicle-mounted communication system is installed in a vehicle 1, and includes ECUs 3, 3, . . . 3 (corresponding to communication devices), which are supplied with power from a positive and negative power supply trunk line (called simply a "power supply trunk line" hereinafter) 20 that is laid in a one-stroke pattern from a front part to a rear part of the vehicle 1. The ECUs 3, 3, . . . 3 exchange communication signals with each other through power line communication (PLC), which uses the power supply trunk line 20 as communication media. Such a simple configuration facilitates a reduction in the number of harnesses.

A DC power supply voltage is applied to one end of the power supply trunk line 20 from a battery 12, which is charged by an alternator 11 that generates power by operating in tandem with an engine (not shown). Loads 13, 13, . . . 13, which do not have communication functionality, are furthermore connected to the power supply trunk line 20. Note that the two lines extending from the alternator 11, the battery 12, the loads 13, and the ECUs 3 indicate positive and negative power supply lines for connecting to the power supply trunk lines 20 over the minimum possible distance.

Moving to FIG. 2, the power supply trunk line 20 includes individual plate-shaped conductive members 21 and 22 (corresponding to a pair of conductive members), formed from copper or an aluminum alloy, for example. The conductive members 21 and 22 are covered by insulative materials 23 and 24, respectively. The conductive members 21 and 22 have cross-sections that are rectangular, for example, and the surfaces thereof corresponding to the long sides of the cross-section face each other in a direction intersecting with a lengthwise direction, with the insulative materials 23 and 24 located therebetween.

Preferably, resistance values of the conductive members 21 and 22 with respect to the lengthwise direction (i.e., the direction along which the power supply trunk line 20 runs) are as low as possible to enable power to be supplied to the ECUs 3 and the loads 13 in a stable manner. If the conductive members 21 and 22 interposed between the insulative materials 23 and 24 are viewed as distributed constant lines, it is preferable that the opposing surface area between the conductive members 21 and 22 per unit of line length, and the distance of the gap in the opposing direction, be kept constant to the greatest extent possible, so that fluctuations in characteristic impedance can be suppressed and power line communication can be carried out in a stable manner.

Figure 3:
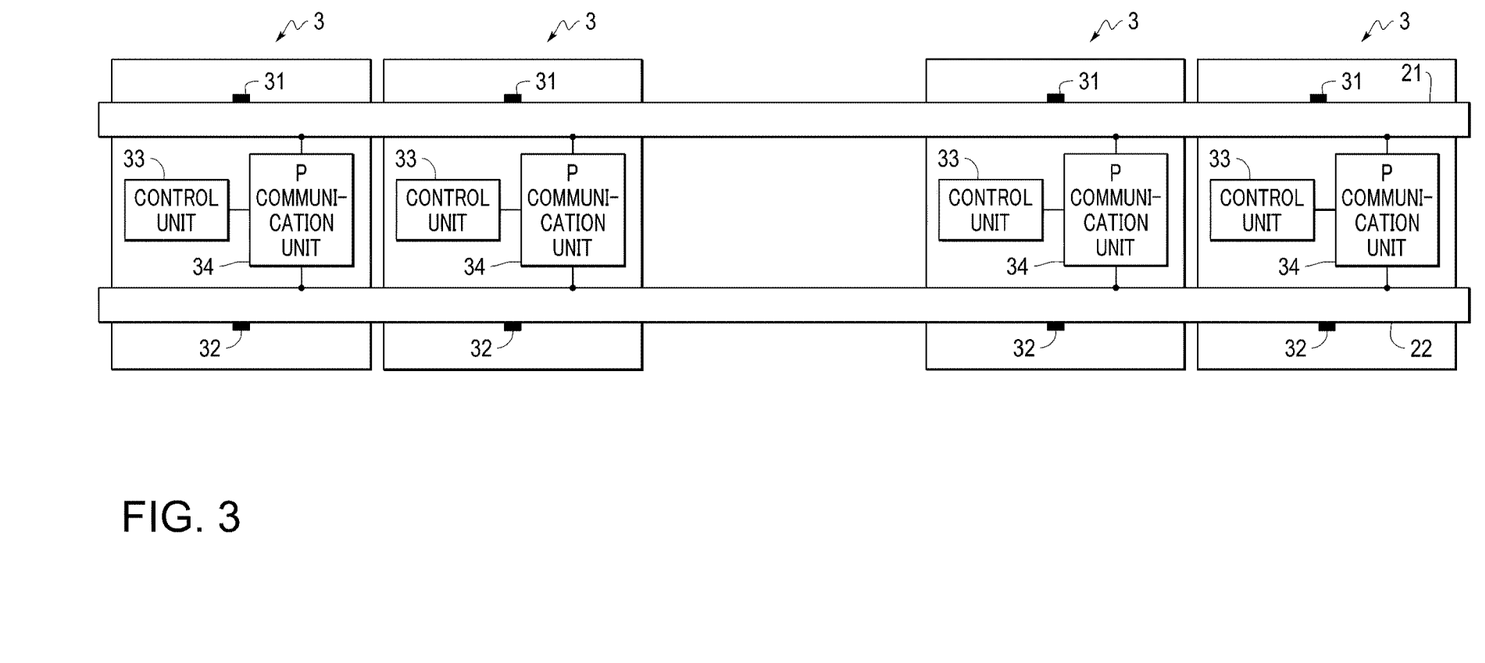
FIG. 3 is a block diagram illustrating an example of the configuration of the vehicle-mounted communication system according to the first embodiment of the present disclosure.

The connections between the power supply trunk line 20 and the ECUs 3, 3, . . . 3, and the communication method, will be described next. FIG. 3 is a block diagram illustrating an example of the configuration of the vehicle-mounted communication system according to the first embodiment of the present disclosure. Each of the ECUs 3, 3, 3, and 3 is supplied with power from the conductive members 21 and 22 over a positive power supply terminal 31 and a negative power supply terminal 32. Each of the ECUs 3, 3, 3, and 3 includes a P communication unit 34 (corresponding to a communication unit) connected to the conductive members 21 and 22 and carrying out power line communication, and a control unit 33 that exchanges communication signals with other ECUs 3 using the P communication unit 34.

Here, the power line communication may be any one of Orthogonal Frequency-Division Multiplexing (OFDM), Spread Spectrum (SS), and Multiple Carrier (MC). For example, in a conventional in-vehicle network that communicates according to a communication standard such as CAN or Ethernet, communication arbitration ensures that two or more types of communication cannot be carried out simultaneously. It has therefore been necessary, in some cases, to divide the network into two or more parts and use a relay device to relay communication signals between the networks.

With the first embodiment, however, a plurality of communication signals can be exchanged at the same time using the power supply trunk line 20 as a communication medium, regardless of which of the aforementioned OFDM, SS, or MC communication methods is used. It is therefore unnecessary to divide the network, and the relay device is eliminated as well.

Thus according to the present first embodiment, the plurality of ECUs 3 are supplied with power from the positive and negative power supply trunk line 20, and exchange communication signals with each other through power line communication using the power supply trunk line 20 as a communication medium. As a result, the number of power supply and communication harnesses can be reduced as compared to a conventional vehicle-mounted communication system in which power supply and communication are not carried out using the power supply trunk line 20. Additionally, a plurality of communication signals can be exchanged simultaneously through power line communication according to the OFDM, SS, or MC method, which makes it possible to eliminate the necessity for a relay device that relays communication signals among the ECUs 3.

Furthermore, according to the first embodiment, power is supplied to the ECUs 3, 3, . . . 3 from the power supply trunk line 20, which is configured so that the pair of conductive members 21 and 22 oppose each other in a direction intersecting with the lengthwise direction, with the insulative materials 23 and 24 located therebetween. Here, selecting members having a suitably low resistance value in the lengthwise direction for the conductive members 21 and 22 provides a comparatively low-resistance, collected power supply path between the front part and the rear part of the vehicle 1, which makes it possible to supply power to the ECUs 3, 3, . . . 3 and the loads 13, 13, . . . 13 in a stable manner. Additionally, selecting members in which the opposing surface area between the conductive members 21 and 22 per unit of line length is constant, and the distance of the gap in the opposing direction is constant, provides a favorable communication path in which fluctuations in characteristic impedance are relatively low. This makes it possible to carry out power line communication among the ECUs 3, 3, . . . 3 in a stable manner.

Second Embodiment

Figure 4:
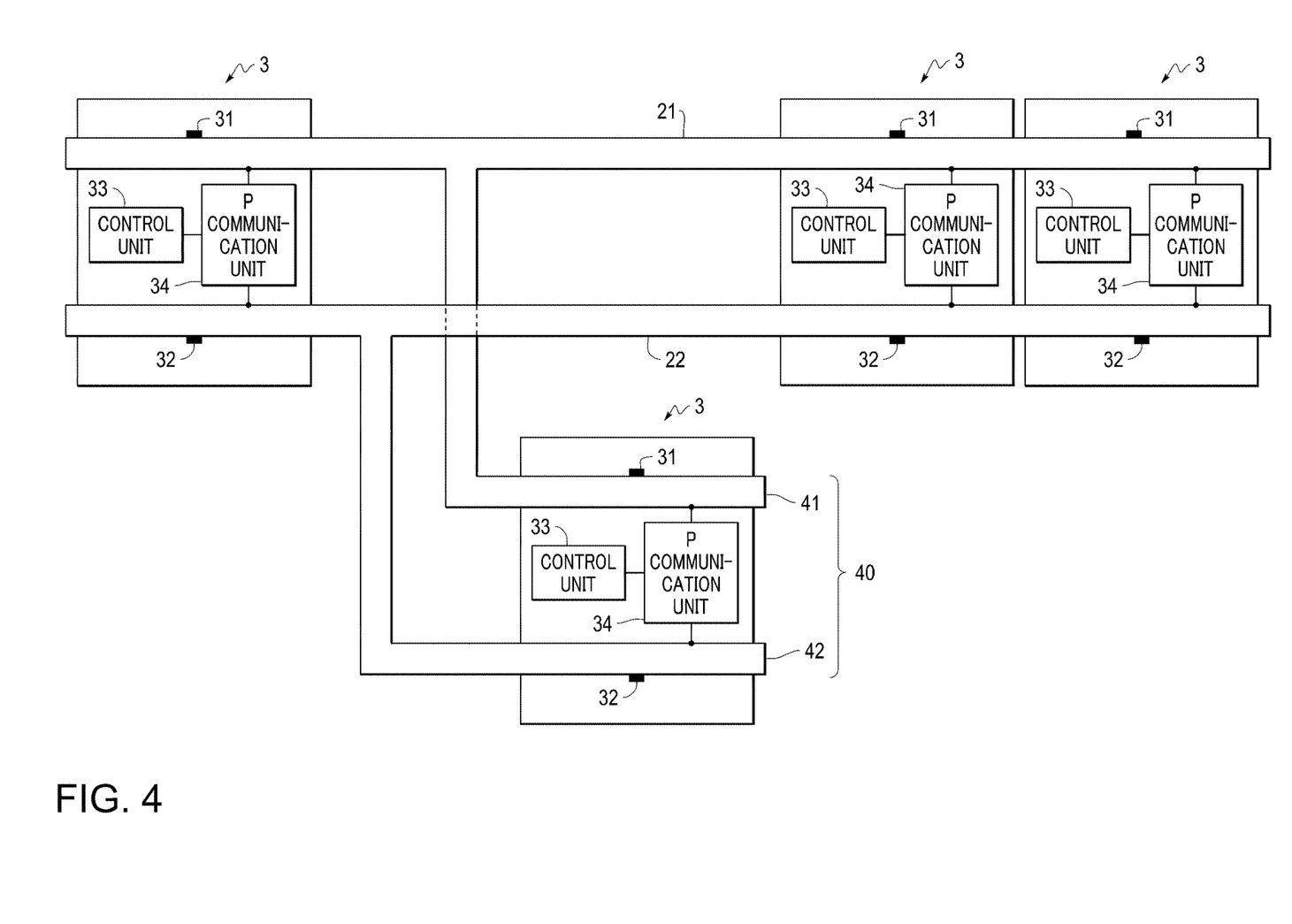
FIG. 4 is a block diagram illustrating an example of the configuration of a vehicle-mounted communication system according to a second embodiment of the present disclosure.

In the first embodiment, the power supply trunk line 20 does not have any branch lines. However, in a second embodiment, power is supplied to the ECUs 3 from branch lines that branch from the power supply trunk line 20. FIG. 4 is a block diagram illustrating an example of the configuration of the vehicle-mounted communication system according to the second embodiment of the present disclosure. In the diagram, 40 indicates a positive and negative branch line (called simply a "branch line" hereinafter) that branches from the power supply trunk line 20, and the branch line 40 includes conductive members 41 and 42 that oppose each other with insulative materials (not shown) located therebetween. The conductive members 41 and 42 are connected as branches to the conductive members 21 and 22, respectively.

Any desired ECU 3 is supplied with power from the conductive members 41 and 42 through the positive power supply terminal 31 and the negative power supply terminal 32, and the P communication unit 34 that carries out power line communication is connected to the conductive members 41 and 42. The other configurations are the same as described the first embodiment with reference to the block diagram in FIG. 3. As such, the same reference signs are appended to parts that correspond to those in the first embodiment, and descriptions thereof will be omitted.

In order to ensure that the power line communication in the power supply trunk line 20 is not affected by the branch line 40 being connected as a branch to the power supply trunk line 20, it is preferable that the line length of the branch line 40 is a length that can be ignored as compared to the wavelength of the power line communication carrier waves. Additionally, if the conductive members 41 and 42 interposed between the insulative materials are viewed as distributed constant lines, it is preferable that the characteristic impedance of the line constituted by the conductive members 41 and 42 be sufficiently higher than the characteristic impedance of the line constituted by the conductive members 21 and 22. The same power line communication as that described in the first embodiment can be achieved if such factors are taken into consideration.

Thus according to the present second embodiment, a given ECU 3 is supplied with power from the branch line 40 branching from the power supply trunk line 20, and exchanges communication signals through power line communication using the branch line 40 and the power supply trunk line 20 as a communication medium. Here, selecting a line length for the branch line 40 that is sufficiently short compared to the wavelength of the power line communication carrier waves ensures that negative influence on the power supply to the ECUs 3, 3, 3, and 3 and the power line communication will be favorably suppressed, which makes it possible to increase the freedom with which power supply lines can be laid with respect to a given single ECU 3.

Third Embodiment

Figure 5:
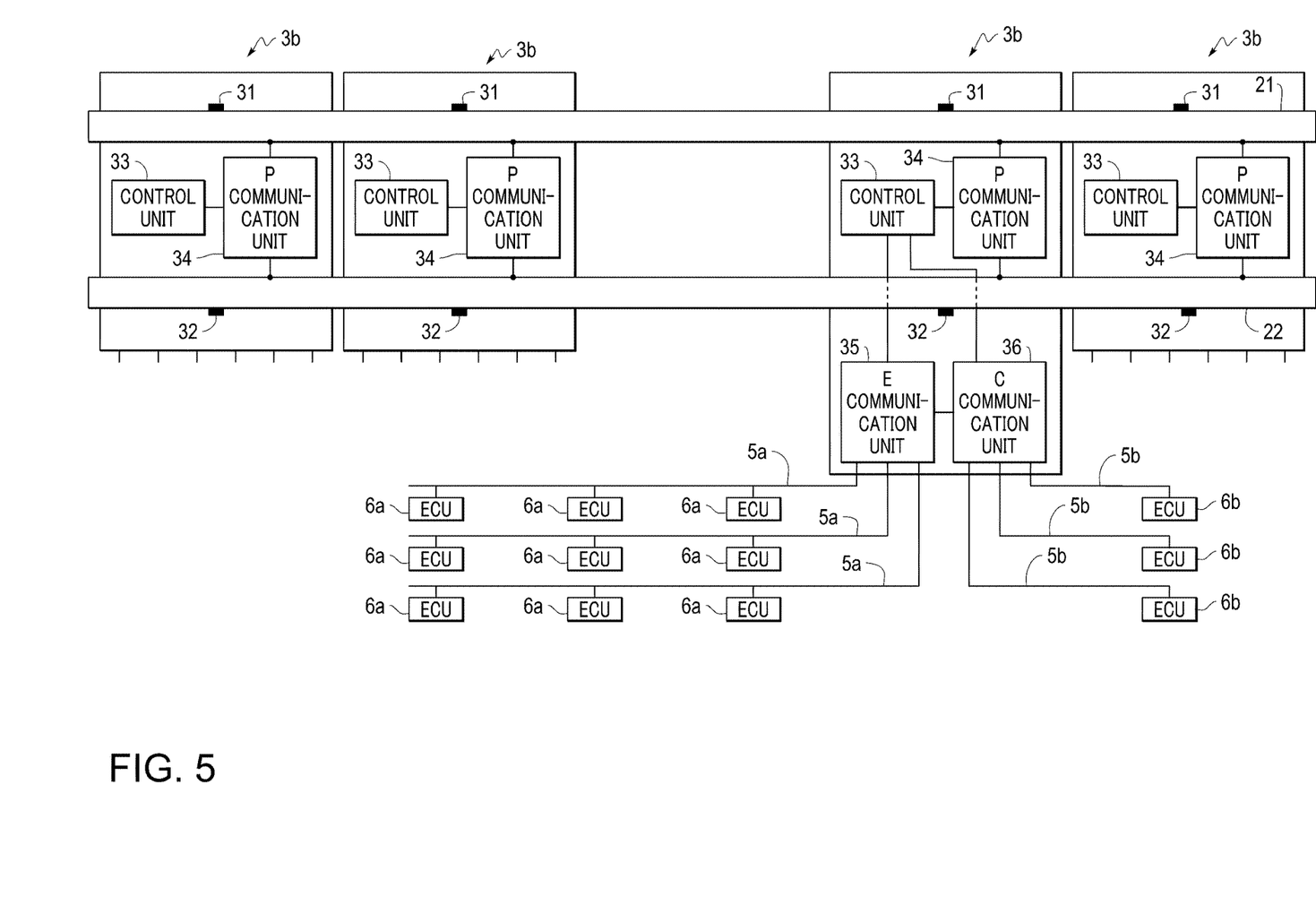
FIG. 5 is a block diagram illustrating an example of the configuration of a vehicle-mounted communication system according to a third embodiment of the present disclosure.

In the first embodiment, the ECUs 3, 3, 3, and 3 are supplied with power from the power supply trunk line 20 and carry out power line communication. In the third embodiment, however, some or all of the ECUs 3, 3, 3, and 3 are replaced with domain controllers. FIG. 5 is a block diagram illustrating an example of the configuration of the vehicle-mounted communication system according to the third embodiment of the present disclosure.

In the diagram, 3b indicates the domain controllers replacing the ECUs 3. Each of the domain controllers 3b (corresponding to a communication device) is supplied with power from the conductive members 21 and 22 over the positive power supply terminal 31 and the negative power supply terminal 32. Each of the domain controllers 3b includes the P communication unit 34 connected to the conductive members 21 and 22 and carrying out power line communication, and the control unit 33 that exchanges communication signals with other domain controllers 3b using the P communication unit 34.

A given domain controller 3b further includes an E communication unit 35 (corresponding to a second communication unit) that carries out communication according to the Ethernet communication standard, and a C communication unit 36 (corresponding to a second communication unit) that carries out communication according to the CAN communication standard. First communication lines 5a, 5a, and 5a, which are Ethernet cables, are connected to the E communication unit 35. Second communication lines 5b, 5b, and 5b, which are twisted pair lines, are connected to the C communication unit 36. ECUs 6a, 6a, and 6a (corresponding to external communication devices) are furthermore connected to each of the first communication lines 5a. ECUs 6b, 6b, and 6b (corresponding to external communication devices; some of the ECUs 6b are not shown) are furthermore connected to each of the second communication lines 5b. The E communication unit 35 and the C communication unit 36 are not shown for the other domain controllers 3b, 3b, and 3b.

In the third embodiment, a given single domain controller 3b receives and aggregates communication signals from some or all of the other domain controllers 3b, 3b, and 3b, the ECUs 6a, 6a, . . . 6a, and the ECUs 6b, 6b, . . . 6b, carries out information processing based on the aggregated communication signals, and sends a communication signal including information based on the processing result to at least one of the other domain controllers 3b, 3b, and 3b, ECUs 6a, 6a, . . . 6a, and ECUs 6b, 6b, . . . 6b. According to this configuration, the traffic of communication signals exchanged via the power supply trunk line 20 is suppressed.

Although all of the ECUs 3, 3, 3, and 3 are replaced with domain controllers 3b in the third embodiment, the configuration is not limited thereto. Some of the ECUs 3 connected to the power supply trunk line 20 may be left unreplaced, and a given single domain controller 3b may receive and aggregate the communication signals from some or all of the ECUs 3 . . . 3, the other domain controllers 3b . . . 3b, the ECUs 6a, 6a, . . . 6a, and ECUs 6b, 6b, . . . 6b.

Additionally, the first communication lines 5a and the second communication lines 5b connected to the domain controllers 3b are not limited to carrying out communication according to the Ethernet and CAN communication standards. The communication may be carried out through communication standards such as LIN (Local Interconnect Network), MOST (Media Oriented Systems Transport), AVTP (Audio Video Transport Protocol), or FlexRay (registered trademark), for example.

Thus according to the present third embodiment, a given single domain controller 3b is communicatively connected to the ECUs 6a, 6a, . . . 6a and the ECUs 6b, 6b, . . . 6b via the first communication lines 5a, 5a, and 5a and the second communication lines 5b, 5b, and 5b, respectively, which are different from the power supply trunk line 20. The given single domain controller 3b aggregates and carries out information processing on the communication signals from the ECUs 3 . . . 3 and some or all of the other domain controllers 3b . . . 3b, ECUs 6a, 6a, . . . 6a, and ECUs 6b, 6b, . . . 6b, and sends a communication signal including information based on the processing result to at least one of the ECUs 3 . . . 3, the other domain controllers 3b . . . 3b, the ECUs 6a, 6a, . . . 6a, and the ECUs 6b, 6b, . . . 6b. Accordingly, the traffic of communication signals exchanged via the power supply trunk line 20 is suppressed, which makes it possible to employ the network using the power supply trunk line 20 as the highest-level network and locate more of the ECUs 3 . . . 3, the domain controllers 3b . . . 3b, the ECUs 6a, 6a, . . . 6a, and the ECUs 6b, 6b, . . . 6b on the in-vehicle network.

Fourth Embodiment

Figure 6:
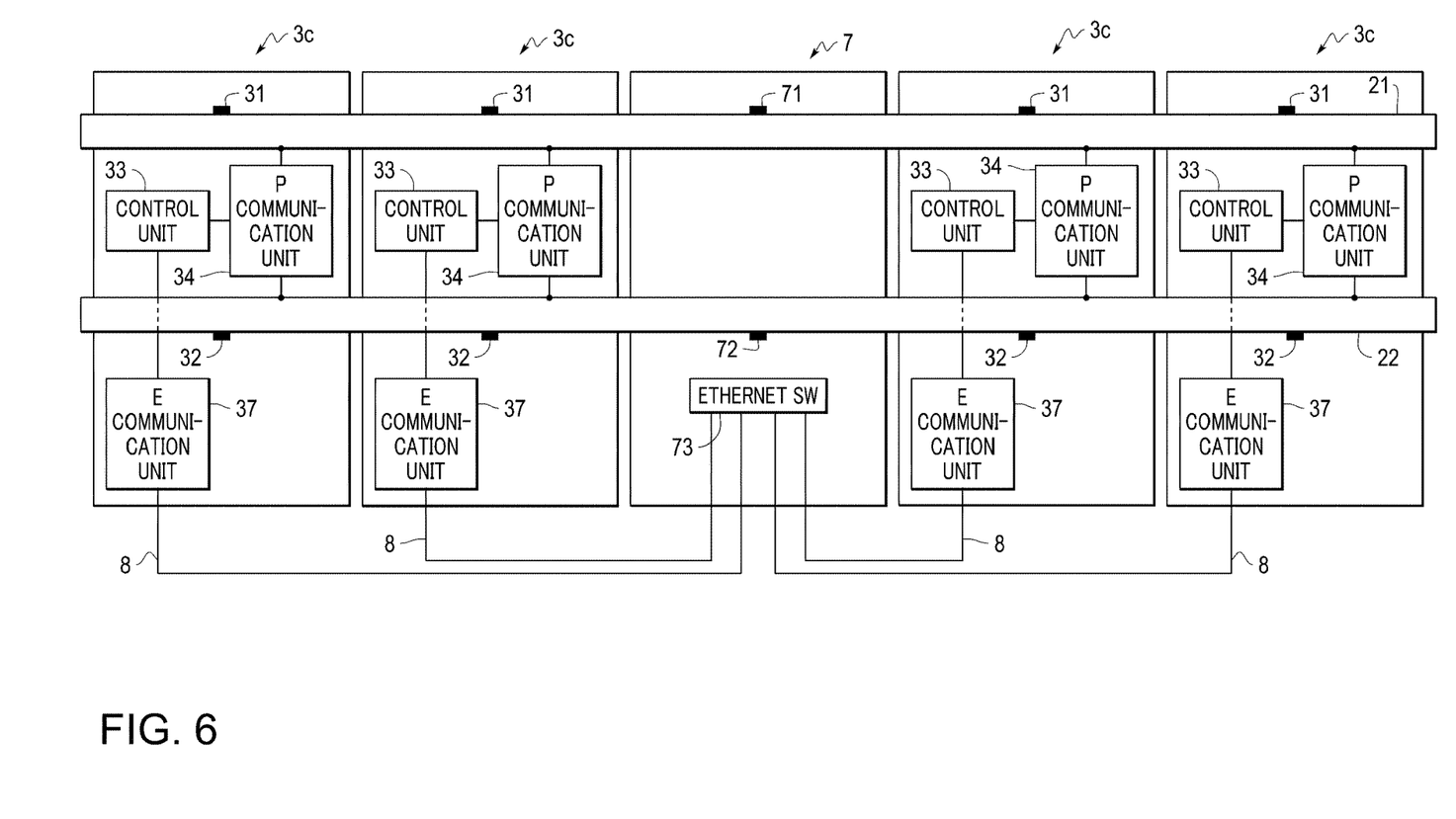
FIG. 6 is a block diagram illustrating an example of the configuration of a vehicle-mounted communication system according to a fourth embodiment of the present disclosure.

In the first embodiment, the ECUs 3, 3, 3, and 3 exchange communication signals only via the power supply trunk line 20, but in a fourth embodiment, the ECUs exchange communication signals via the power supply trunk line 20 and/or a relay device. FIG. 6 is a block diagram illustrating an example of the configuration of the vehicle-mounted communication system according to the fourth embodiment of the present disclosure.

In the diagram, 3c indicates an ECU (a communication device) that, compared to the ECUs 3, further includes an E communication unit 37 for carrying out Ethernet (registered trademark) communication. Compared to the vehicle-mounted communication system according to the first embodiment, this vehicle-mounted communication system further includes a relay device 7 that relays communication signals among a plurality of networks.

The relay device 7 is supplied with power from the conductive members 21 and 22 via a positive power supply terminal 71 and a negative power supply terminal 72, and includes an Ethernet switch (called "Ethernet SW" hereinafter) 73 that relays communication signals on the basis of a destination MAC address (Media Access Control address). The Ethernet SW 73 includes a physical Ethernet interface. Communication lines 8, 8, 8, and 8, which are Ethernet cables, are connected to the Ethernet SW 73.

In each ECU 3c, the E communication unit 37 is connected to a communication line 8. Aside from this, the same reference signs are appended to parts that correspond to those in the first embodiment, and descriptions thereof will be omitted.

The control unit 33 of the ECU 3c doubles the exchange of communication signals using the P communication unit 34 and the E communication unit 37. The way in which the doubled communication path is used is not particularly limited. For example, the ECU 3c continuously exchanging communication via the power supply trunk line 20 and the relay device 7 corresponds to a so-called "full-time dual" state. However, a standby configuration can also be employed, where the ECU 3c normally communicates only via the relay device 7, and switches to communication via the power supply trunk line 20 when communication via the relay device 7 has become impossible due to a disconnect, a malfunction in the relay device 7, or the like.

Thus according to the present fourth embodiment, each of the ECUs 3c, 3c, 3c, and 3c is connected to the Ethernet SW 73 of the relay device 7 via the communication lines 8, 8, 8, and 8, respectively, and each ECU 3c is doubled so as to exchange communication signals via at least one of the power supply trunk line 20 and the relay device 7. As a result, the ECUs 3c can exchange communication signals with each other with a high level of reliability.

Although the present fourth embodiment describes the relay device 7 as relaying the communication signals on the basis of the Ethernet communication standard, the configuration is not limited thereto. For example, the relay device 7 may relay the communication signals on the basis of the CAN, LIN, MOST, AVTP, or FlexRay communication standard. In this case, the ECUs 3c include communication units corresponding to the communication standard, and the communication lines 8, 8, 8, and 8 are also based on the communication standard.

Additionally, the number of communication lines 8, 8, 8, and 8 need not be the same as the number of ECUs 3c. For example, if the communication line 8 carries out communication according to a communication standard such as CAN, two or more ECUs 3c can of course be connected to a single communication line 8. Furthermore, the relay device 7 is not needed if all of the ECUs 3c are connected to a single communication line 8.

Fifth Embodiment

Figure 7:
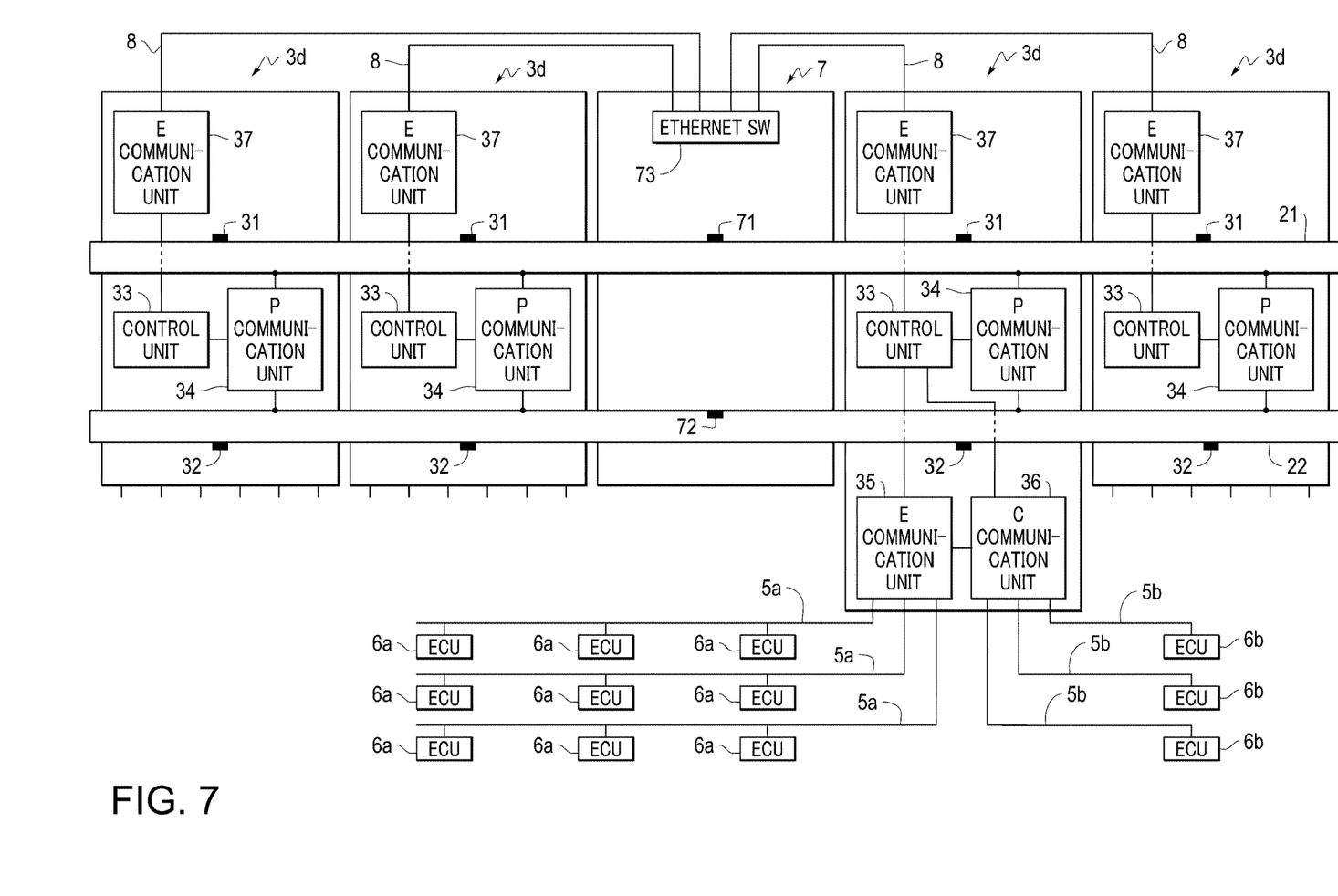
FIG. 7 is a block diagram illustrating an example of the configuration of a vehicle-mounted communication system according to a fifth embodiment of the present disclosure.

In the third embodiment, the domain controllers 3b replacing the ECUs 3 exchange communication signals only via the power supply trunk line 20, but in a fifth embodiment, the domain controllers exchange communication signals via the power supply trunk line 20 and/or the relay device 7. FIG. 7 is a block diagram illustrating an example of the configuration of the vehicle-mounted communication system according to the fifth embodiment of the present disclosure.

In the diagram, 3d indicates a domain controller that, compared to the domain controller 3b, further includes the E communication unit 37, which carries out Ethernet communication. Compared to the vehicle-mounted communication system according to the third embodiment, this vehicle-mounted communication system further includes the relay device 7 that relays communication signals among a plurality of networks.

As in the fourth embodiment, in the relay device 7, the communication lines 8, 8, 8, and 8 are connected to the Ethernet SW 73. In each domain controller 3d, the E communication unit 37 is connected to a communication line 8, in the same manner as in the third embodiment. Aside from this, the same reference signs are appended to parts that correspond to those in the third and fourth embodiments, and descriptions thereof will be omitted.

The effects of replacing the ECUs 3 with the domain controllers 3d are the same as those described in the third embodiment, and the effects of further including the relay device 7 are the same as in the fourth embodiment. Therefore, these will not be described in detail.

Thus according to the present fifth embodiment, a given single domain controller 3d aggregates and carries out information processing on the communication signals from some or all of the ECUs 3 . . . 3, the other domain controllers 3d . . . 3d, the ECUs 6a, 6a, . . . 6a, and the ECUs 6b, 6b, . . . 6b, and sends a communication signal including information based on the processing result to at least one of the ECUs 3 . . . 3, the other domain controllers 3d . . . 3d, the ECUs 6a, 6a, . . . 6a, and the ECUs 6b, 6b, . . . 6b. Accordingly, the traffic of communication signals exchanged via the power supply trunk line 20 is suppressed, which makes it possible to employ the network using the power supply trunk line 20 as the highest-level network and locate more of the ECUs 3 . . . 3, the domain controllers 3d . . . 3d, the ECUs 6a, 6a, . . . 6a, and the ECUs 6b, 6b, . . . 6b on the in-vehicle network.

Additionally, according to the present fifth embodiment, each of the domain controllers 3d, 3d, 3d, and 3d is connected to the Ethernet SW 73 of the relay device 7 via the communication lines 8, 8, 8, and 8, respectively, and each domain controller 3d is doubled so as to exchange communication signals via at least one of the power supply trunk line 20 and the relay device 7. As a result, the domain controllers 3d can exchange communication signals with each other with a high level of reliability.

Additionally, according to the third, fourth, or fifth embodiment, and the E communication units 35 and 37 carry out Ethernet communication, and thus the domain controllers 3*b* and 3*d* or the relay device 7 can exchange communication signals at high speeds.

The invention claimed is:

1. A vehicle-mounted communication system comprising a plurality of electronic control units to which power is supplied from a positive and negative power supply trunk line installed in a vehicle, wherein:
 each of the electronic control units includes a first communication unit that performs power line communication via the power supply trunk line;
 the electronic control units exchange communication signals with each other using the first communication units;
 a first electronic control unit among the plurality of electronic control units is communicatively connected, via a communication line that is different from the power supply trunk line, to an external electronic control unit not directly supplied with power from the power supply trunk line, the first electronic control unit further including:
  a second communication unit that receives a communication signal from the external electronic control unit; and
  a control unit that aggregates the communication signals received by the first communication unit and the second communication unit, and carries out information processing based on the aggregated communication signals, and
 wherein a communication signal including information based on a processing result is sent to at least one of another electronic control unit of the plurality of electronic control units, the another electronic control unit being different from the first electronic control unit among the plurality of electronic control units, and the external electronic control unit.

2. The vehicle-mounted communication system according to claim 1,
 wherein the power supply trunk line is configured including a pair of conductors opposing each other in a direction intersecting with a lengthwise direction, with an insulative material being located between the conductors.

3. The vehicle-mounted communication system according to claim 1,
 wherein a second electronic control unit that is the same as or different from the first electronic control unit among the plurality of electronic control units is supplied with power from a positive and negative branch line branching from the power supply trunk line; and
 the first communication unit of the second electronic control unit carries out power line communication via the branch line and the power supply trunk line.

4. The vehicle-mounted communication system according to claim 1,
 wherein the second communication unit carries out communication based on an Ethernet standard.

5. A vehicle-mounted communication system comprising a plurality of electronic control units to which power is supplied from a positive and negative power supply trunk line installed in a vehicle, wherein:
 each of the electronic control units includes a communication unit that performs power line communication via the power supply trunk line;
 the electronic control units exchange communication signals with each other using the communication units; and
 a relay that is communicatively connected to each of the electronic control units and relays the communication signals exchanged among the electronic control units,
 wherein the electronic control units have redundant configurations in which the communication signals are exchanged via at least one of the power supply trunk line and the relay.

* * * * *